Feb. 19, 1963   R. W. WINTER   3,077,695
MINNOW TRAP AND CARRIER
Filed July 1, 1960
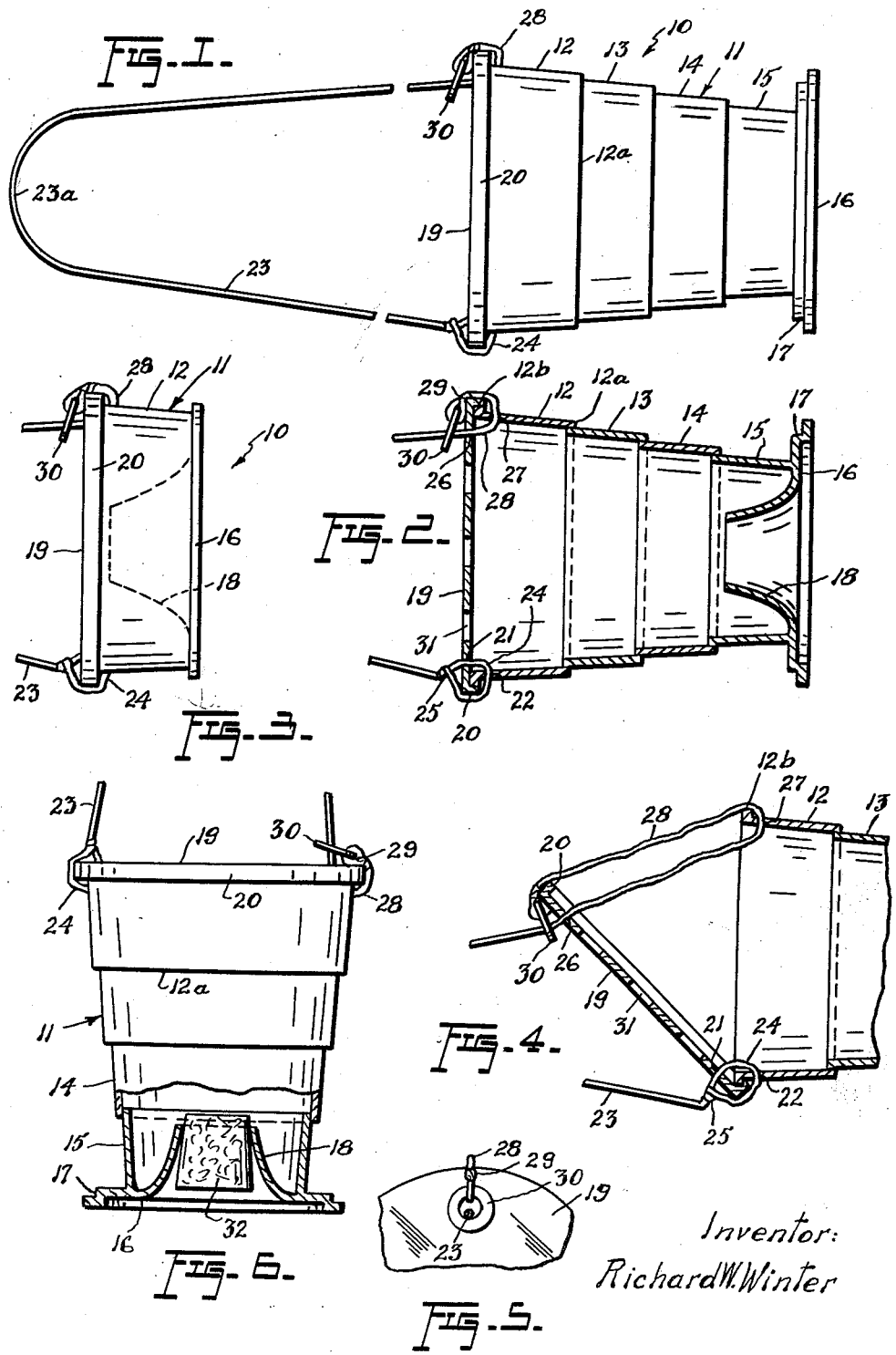
Inventor:
Richard W. Winter United States Patent Office 3,077,695
Patented Feb. 19, 1963

3,077,695
MINNOW TRAP AND CARRIER
Richard W. Winter, Palmer, Kans.
Filed July 1, 1960, Ser. No. 40,469
5 Claims. (Cl. 43—56)

This invention relates to new and useful improvements in fishing accessories, that is, accessories for use by fishermen, and the principal object of the invention is to provide an effectively usable minnow trap which, when not in use, may be quickly and easily collapsed to a compact form for convenient carrying or storage.

As such, an important feature of the invention resides in the provision of a minnow trap having an elongated housing consisting of a plurality of annular sections which are slidably telescoped together so that the housing may be extended or collapsed as desired, all but one of these sections being received in that one section when the housing is in its collapsed form, substantially in the form of a disc. A pair of end plates are provided at the end sections of the housing, one of these being equipped with a no-return minnow inlet, while the other is provided with water passages, whereby water may flow through the housing when the device is placed longitudinally in a river or a stream. Another important feature of the invention resides in the provision of an elongated flexible element which has its end portions connected to the aforementioned other end plate and to the housing in such manner that the end plate is hinged for opening and closing movement to facilitate removal of minnows trapped in the housing and is also automatically retained in its closed position when the flexible element is utilized to anchor the trap in a stream of water. A further important feature of the invention resides in its ability to be used as a minnow pail or carrier when it is not used as a trap.

Some of the advantages of the invention reside in its simplicity of construction, efficient and dependable operation, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the invention in its extended form for use as a minnow trap;

FIGURE 2 is a fragmentary longitudinal sectional view thereof;

FIGURE 3 is a side elevational view of the invention in its collapsed form;

FIGURE 4 is a fragmentary longitudinal sectional view showing the arrangement of the flexible element which constitutes the hinge means and fastening means for one of the end plates of the trap housing;

FIGURE 5 is a fragmentary end elevational view of the hinged end plate; and

FIGURE 6 is a view, partly in side elevation and partly in vertical section, showing the device used as a minnow pail or carrier.

Referring now to the accompanying drawings in detail, the collapsible minnow trap and carrier in accordance with the invention is designated generally by the numeral 10 and embodies in its construction an elongated, substantially tubular housing 11 consisting of a plurality of imperforate annular sections 12, 13, 14, 15, any suitable number of which may be provided.

The sections 12, 13, 14, 15 are slidably telescoped together and are complementally tapered so that when the housing is extended to the form shown in FIGURES 1, 2 and 6, the adjacent sections are slightly overlapped and engage each other with a frictional fit which not only prevents the sections to become separated, but also renders the overlapped joints between the sections substantially leakproof. On the other hand, when the housing is collapsed to the form shown in FIGURE 3, the sections 13, 14 and 15 are received within the section 12, so that the housing assumes a compact, disc-shaped configuration.

The section 15 at one end of the housing is secured to or formed integrally with an end plate 16 which has its marginal edge portion projecting radially outwardly beyond the associated section 15 and formed with an annular step 17. The step 17 provides a seat for the edge portion 12a of the section 12 when the housing is collapsed, as will be readily apparent. The portion of the plate 16 within the diameter of the section 15 is provided with an inwardly tapered, funnel-like inlet 18 whereby minnows may enter the housing without being able to leave the same.

The section 12 of the housing is provided with an end plate 19 having a marginal lip 20 which seats upon the edge 12b of the section 12 when the plate 19 is in its closed position, as is best illustrated in FIGURE 2. The plate 19 is formed at one side thereof with an aperture 21 while a similar aperture 22 is provided in the adjacent portion of the section 12, and one end portion of an elongated flexible element such as a cord 23 is threaded through the apertures 21, 22 as indicated at 24 and tied as shown at 25, whereby to provide means for hingedly conecting the plate 19 to the housing 11 for opening and closing movement, as will be clear from FIGURES 2 and 4. Similar apertures 26, 27 are provided at the diametrically opposite side of the plate 19 and housing section 12, through which apertures is threaded an expansible and contractible loop 28 formed at the other end of the cord 23, the extremity of the cord being tied as at 29 to a washer 30 through which the cord extends to form the loop. It will be apparent that when the cord 23 is pulled so as to tighten or contract the loop 28 as shown in FIGURE 2, the plate 19 will be retained in its closed position. However, by slackening the cord and expanding the loop 28 as shown in FIGURE 4, opening of the plate 19 will be possible, whereby to facilitate removal of minnows caught in the trap.

When the trap is placed in use, it is positioned longitudinally in a stream of water and in anchored in such a position by engaging the intermediate portion 23a of the cord 23 with a stick, or the like, inserted in the bottom of the stream. A plurality of water passages 21, smaller in size than the inlet 18, are provided in the plate 19 which faces upstream, so that water may flow through the housing and out of the minnow inlet 18. Of course, the device may also be used in still water, as will be understood.

When it is desired to use the device as a minnow pail or carrier rather than as a trap, a suitable imperforate closure plug 32 is inserted in the inlet 18 as shown in FIGURE 6, whereupon the device may be conveniently carried in a vertical position by the use of the cord 23.

It is manifest that the invention may be made from any suitable material and in any suitable size and it will be also apparent that when it is collapsed to the form shown in FIGURE 3, it may be conveniently carried in the fisherman's pocket, tackle box, or the like.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, such as may lie within the spirit and scope of the invention as claimed.

What is claimed as new is:

1. A collapsible minnow trap and carrier, comprising an elongated substantially tubular housing including a set of annular sections slidably telescoped together whereby the housing may be extended and collapsed, all but one of said sections being received in said one of said sections when the housing is in its collapsed form, a pair of end plates provided on the sections at the opposite ends of the housing, a funnel-like minnow inlet provided in one of said end plates, the other end plate being formed with water passages of a smaller size than said inlet, and an elongated flexible anchoring and carrying element having one end portion thereof threaded through apertures at one side of said other end plate and at the adjacent side of said housing and then secured to itself to provide a fixed loop whereby to hingedly connect said other end plate to the housing for opening and closing movement, the other end portion of said element being threaded through apertures at the relatively opposite side of said other end plate and said housing and then joined to itself by a loose sliding connection to provide an expansible and contractible loop whereby to openably retain said other end plate in its closed position.

2. A collapsible minnow trap and carrier, comprising an elongated housing including a set of imperforate annular sections slidably telescoped together whereby the housing may be extended and collapsed, said sections having a leakproof frictional fit when extended, an end plate provided at one end of the housing and having a funnel-like minnow inlet, a removable imperforate closure for said inlet, an openable cover provided at the other end of said housing and formed with water passages, and a carrying handle connected to the housing adjacent said cover, said handle comprising an elongated flexible element, one end portion of said element hingedly connecting said cover to said housing for opening and closing movement, and the other end portion of said element being threaded through apertures in the housing and cover and then joined to itself by a loose sliding connection to provide an expansible and contractible loop for openably retaining the cover in its closed position.

3. In a minnow carrier, the combination of a housing having an open end, a cover for said open end, and a carrying handle comprising an elongated flexible element hingedly connecting said cover to said housing, the other end of said element being threaded through apertures in said housing and cover and then joined to itself by a loose sliding connection to provide an expansible and contractible loop for openably retaining the cover in its closed position.

4. The combination of a receptacle having an open end and provided adjacent said open end with first and second apertures disposed at relatively opposite sides of the receptacle, a closure plate for the open end of said receptacle, said closure plate having its marginal edge portion provided with first and second openings disposed adjacent the respective first and second apertures when said plate closes the open end of the receptacle, and a combined carrying handle and closure hinging and retaining means comprising an elongated flexible element having one end portion thereof threaded through the first opening of said closure plate and through the first aperture of the receptacle and then secured to itself to provide a fixed loop whereby to hingedly connect the plate to the receptacle for swinging movement between open and closed positions, the other end portion of said flexible element being threaded through the second opening of the plate and through the second aperture of the receptacle and then joined to itself by a loose sliding connection to provide an expansible and contractible loop whereby to permit swinging of the closure plate to its open position while said last mentioned loop is expanded and whereby to retain said plate in its closed position when said last mentioned loop is contracted.

5. The device as defined in claim 4 wherein said loose sliding connection comprises an eye provided at said other end of said flexible element, said other end portion of said element passing slidably through said eye whereby to form said expansible and contractible loop.

References Cited in the file of this patent

UNITED STATES PATENTS

| | | |
|---|---|---|
| 814,480 | Saffell | Mar. 6, 1906 |
| 921,514 | Dacus | May 11, 1909 |
| 951,656 | Newberry | Mar. 8, 1910 |
| 1,513,921 | Menefeo | Nov. 4, 1924 |
| 2,688,817 | Brune | Sept. 14, 1954 |